United States Patent
Wang

(10) Patent No.: US 8,222,876 B2
(45) Date of Patent: Jul. 17, 2012

(54) POWER MANAGEMENT CHIP WITH DUAL FUNCTION PIN

(75) Inventor: Ko-Cheng Wang, Nantou County (TW)

(73) Assignee: Richtek Technology Corporation, Hsin-Chu (TW)

( * ) Notice: Subject to any disclaimer, the term of this patent is extended or adjusted under 35 U.S.C. 154(b) by 582 days.

(21) Appl. No.: 12/383,402

(22) Filed: Mar. 24, 2009

(65) Prior Publication Data
US 2010/0072963 A1    Mar. 25, 2010

(30) Foreign Application Priority Data
Sep. 22, 2008  (TW) ................................ 97136382 A

(51) Int. Cl.
*G05F 1/40* (2006.01)
*G05F 1/44* (2006.01)
*G05F 1/56* (2006.01)

(52) U.S. Cl. ......... 323/282; 323/283; 323/284; 323/285

(58) Field of Classification Search ........... 323/282–285
See application file for complete search history.

(56) References Cited

U.S. PATENT DOCUMENTS
7,098,632 B2 * 8/2006 Chen et al. .................... 323/222
7,576,528 B2 * 8/2009 Wang et al. .................... 323/284
* cited by examiner

*Primary Examiner* — Bao Q Vu
(74) *Attorney, Agent, or Firm* — Tung & Associates

(57) ABSTRACT

The present invention discloses a power management chip with a dual function pin, the power management chip outputting pulse-width-modulation signals to control the switching of an up-gate transistor and a low-gate transistor for converting an input voltage to an output voltage, the up-gate and low-gate transistors being electrically connected to a node, the power management chip comprising: a dual function pin for electrically connecting with the input voltage or the node; a voltage sensing circuit electrically connected with the dual function pin for detecting the level of the input voltage; and a clock detection circuit electrically connected with the dual function pin for determining whether the signal received by the dual function pin is an oscillation signal.

10 Claims, 4 Drawing Sheets

POWER MANAGEMENT CHIP WITH DUAL FUNCTION PIN

FIELD OF INVENTION

The present invention relates to a power management chip with a dual function pin, the dual function pin providing both functions of power transistor ON-time calculation and mode selection.

DESCRIPTION OF RELATED ART

In a switching power converter circuit, there are two conventional methods to determine the power transistor ON-time period Ton. Taking a buck converter circuit for example, one method is shown in FIG. 1, wherein a power management chip 10 outputs pulse-width-modulation (PWM) signals to respectively control the switching of up-gate and low-gate power transistors Q1 and Q2, which cooperate with an inductor L to convert an input voltage Vin to an output voltage Vout. The method to determine the power transistor ON-time period is to provide a TON pin electrically connected with the input voltage Vin via a resistor R1; by detecting a magnitude of the input voltage Vin, the power transistor ON-time period can be calculated. The other method is shown in FIG. 2, wherein the TON pin of the power management chip 20 is electrically connected with a Phase node between the power transistor Q1 and Q2; by detecting the voltage at the Phase node, which represents the input voltage Vin during the ON-time period of the up gate power transistor Q1, the power transistor ON-time period can be calculated. (The pins of the power management chip 10 and 20 which are not related to the present invention are omitted in the drawings.)

In the foregoing prior art, if the operation mode of the power converter circuit [e.g., under a Continuous Conduction Mode (CCM) or Diode Emulation Mode (DEM)] is to be controlled, an extra pin will be required for achieving such mode selection function, such as the mode selection pin MODE shown in FIGS. 1 and 2.

The present invention combines the ON-time calculation pin TON and mode selection pin MODE into one pin to reduce the pin number of a power management chip.

SUMMARY OF THE INVENTION

An objective of the present invention is to provide a power management chip with a dual function pin.

In order to achieve the foregoing objective, the present invention provides a power management chip with a dual function pin, the power management chip outputting PWM signals to control the switching of an up-gate transistor and a low-gate transistor for converting an input voltage to an output voltage, the up-gate and low-gate power transistors being electrically connected to a node, the power management chip comprising: a dual function pin for electrically connecting with the input voltage or the node; a voltage sensing circuit electrically connected with the dual function pin for detecting a level of the input voltage; and a clock detection circuit electrically connected with the dual function pin for determining whether the signal received by the dual function pin is an oscillation signal.

In the foregoing power management chip, preferably, the dual function pin provides both functions of power transistor ON-time calculation and mode selection. The operation mode of the power management chip is determined by the connection of the dual function pin depending on whether it is electrically connected with the input voltage or the node.

The objectives, technical details, features, and effects of the present invention will be better understood with regard to the detailed description of the embodiments below, with reference to the drawings.

DESCRIPTION OF THE PREFERRED EMBODIMENTS

Figure 1:
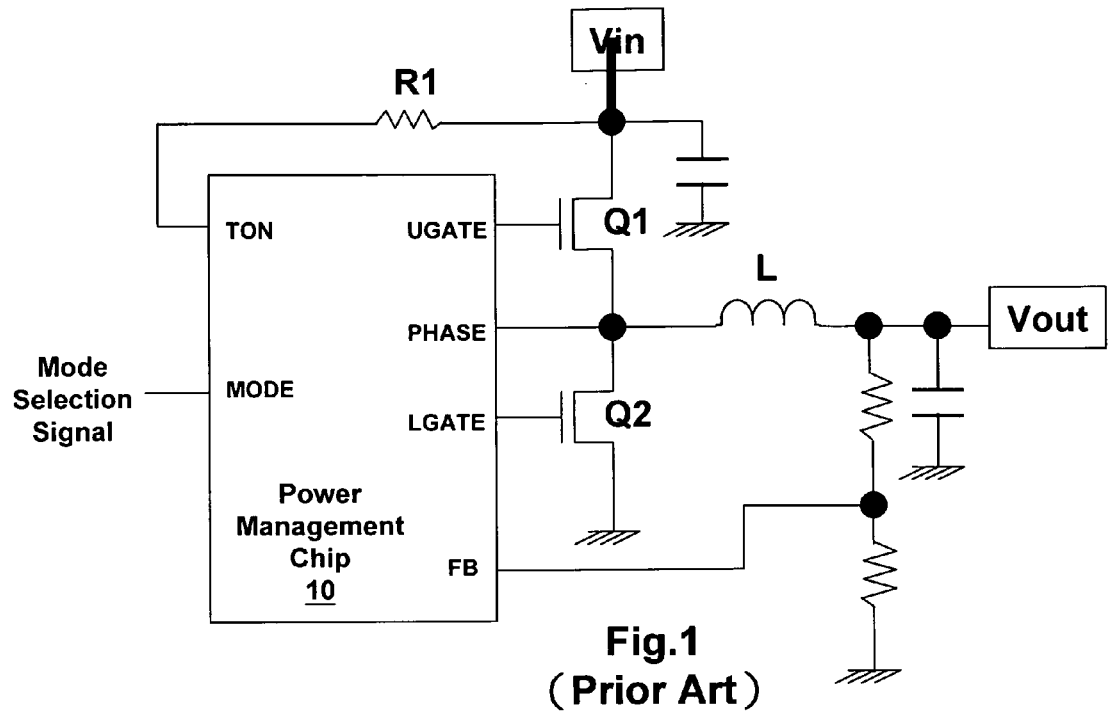
FIGS. 1 and 2 show that the power management chips in prior art require an ON-time calculation pin TON and a mode selection pin MODE.
Figure 2:
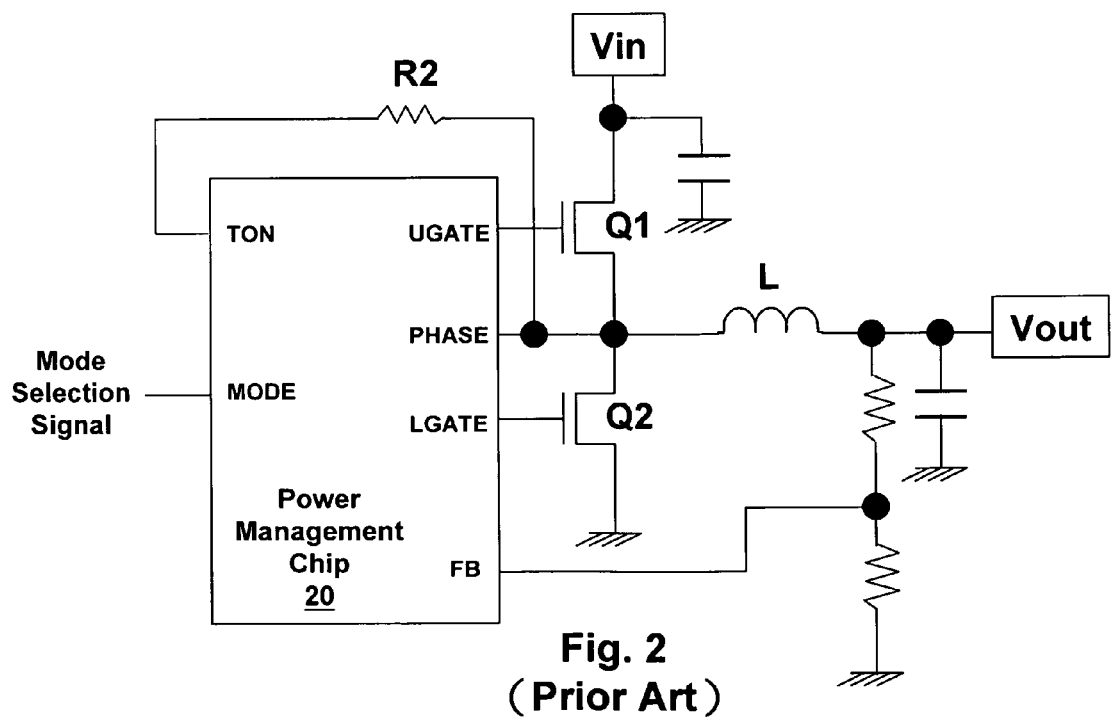
Figure 3:
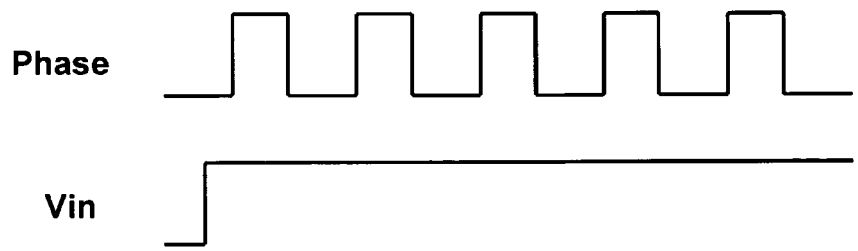
FIG. 3 shows the wave forms of the voltage at the Phase node and the input voltage Vin.

FIG. 3 shows the relationship between the voltage at the Phase node (hereinafter "phase voltage") and the input voltage Vin. After power on, the input voltage Vin maintains a constant value, but the phase voltage oscillates in a form similar to a clock signal; yet both the phase voltage and the input voltage Vin can provide information regarding the level of the input voltage Vin. Thus, we can use the difference between the two signals for mode selection.

Figure 4:
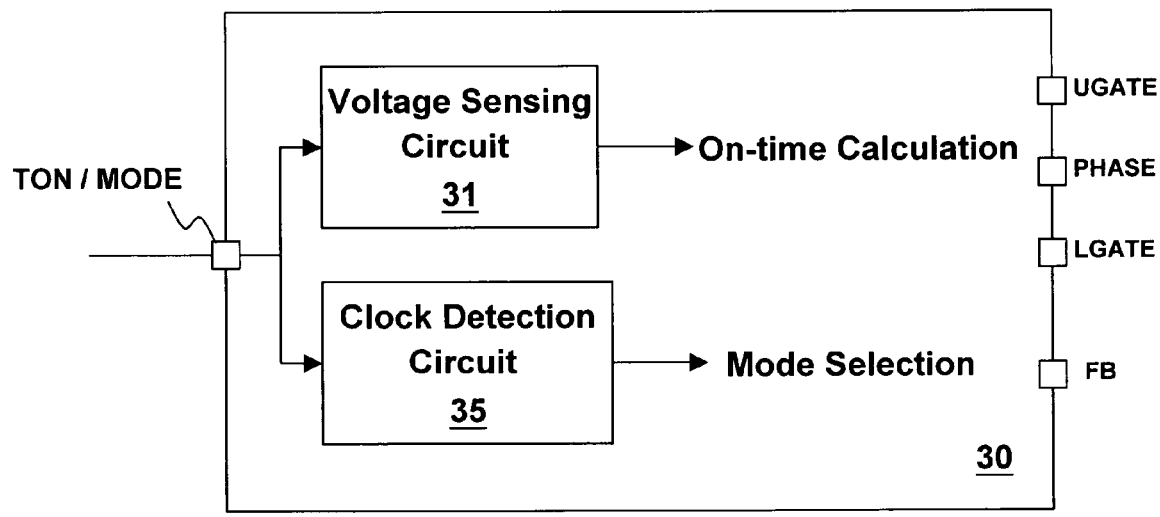
FIG. 4 shows an embodiment of the present invention.

Referring to FIG. 4, in the power management chip 30 according to an embodiment of the present invention, one single pin TON/MODE provides both functions of "ON-time calculation (through receiving information related to the input voltage Vin)" and "mode selection". (The circuits in the power management chip 30 which are not related to the present invention are omitted, such as the PWM circuit, etc.) The TON/MODE pin can be electrically connected to the input voltage Vin or the phase voltage, and the operation mode of the power management chip is determined by the connection thereof. The power management chip 30 includes two circuits electrically connected with the TON/MODE pin, wherein a voltage sensing circuit 31 detects a level of the input voltage Vin and determines the ON-time period Ton according to the level. Regardless whether the TON/MODE pin is electrically connected to the input voltage Vin or the phase voltage, the voltage sensing circuit 31 can retrieve the level of the input voltage Vin, and this can be embodied in many forms; for example, the level of the input voltage can be obtained by sampling and holding a peak value of the signal at the TON/MODE pin after power on and the circuit has become stable. In addition, a clock detection circuit 35 is electrically connected with the TON/MODE pin for determining whether the signal received thereby is an oscillating signal or a constant signal; the former indicates that the TON/MODE pin is electrically connected with the phase voltage, and the later indicates that the TON/MODE pin is electrically connected with the input voltage Vin. The mode selection (for example, to determine whether the power management chip 30 should operate in the CCM or the DEM) can be achieved according to the detection result of the clock detection circuit 35 (i.e., whether the signal is an oscillating signal or not). The clock detection circuit 35 can be embodied in many forms; for example, it can detect a falling edge of the signal received by the TON/MODE pin or compare the signal received by the TON/MODE pin with a low level slightly larger than zero to determine whether the signal received in the TON/MODE pin is an oscillating signal.

Figure 5:
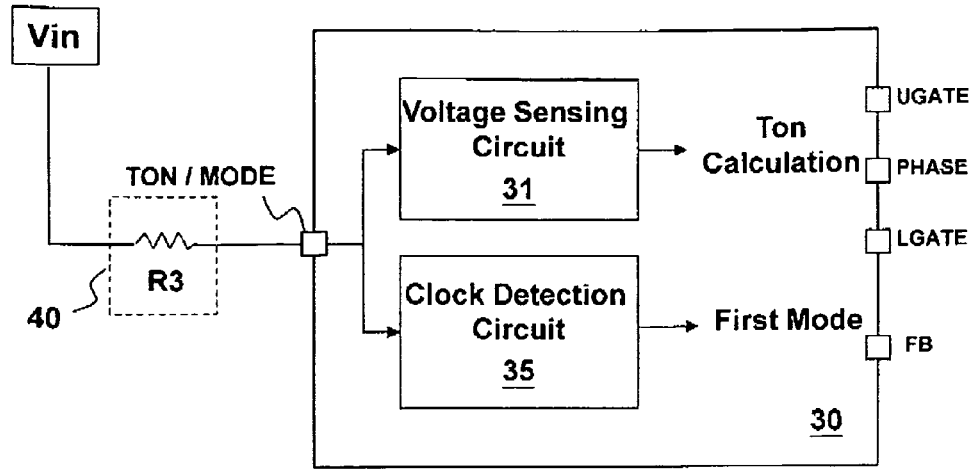
FIGS. 5 and 6 explain how mode selection is achieved.
Figure 6:
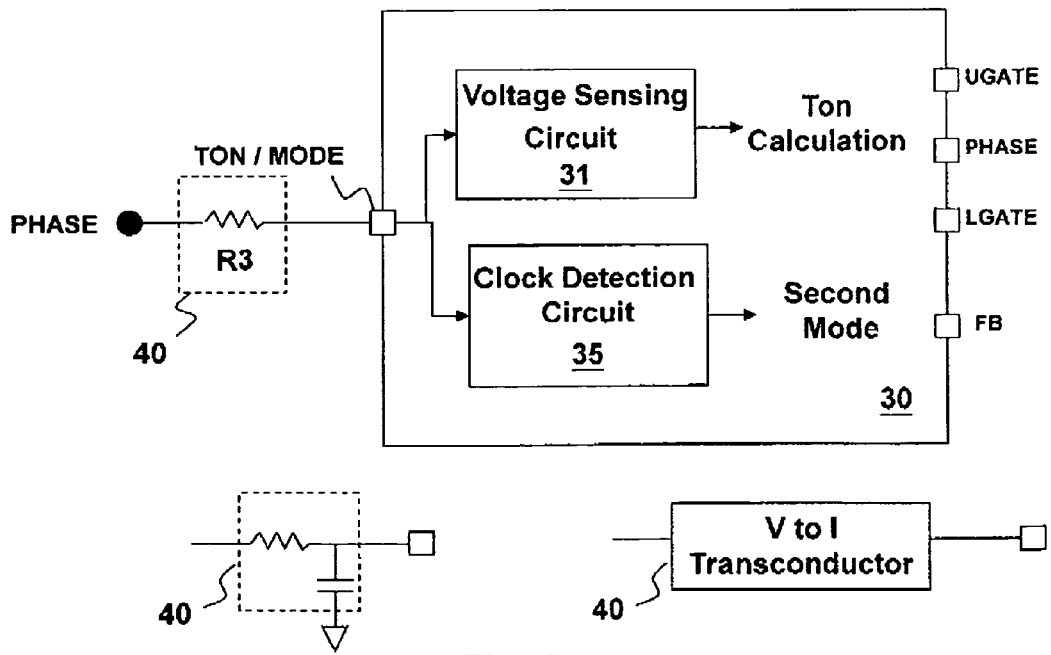

Referring to. FIG. 5 and FIG. 6, the term "electrically connected" as used in the context of this invention means that an electrical signal can be transferred from one side to the other, but does not mean that the two sides must be in direct connection. As shown in the drawings, the TON/MODE pin can be electrically connected with the input voltage Vin or the phase voltage via an interposed circuit 40. The interposed circuit 40 can provide energy saving, noise filtering, or other functions; for example, the interposed circuit 40 as shown is a resistor R3 to provide a voltage drop, so that the interior circuitry of the power management chip 30 can operate under a lower voltage. In other embodiments, the interposed circuit 40 can include a capacitor (for filtering), or a transconductor (for converting a voltage signal to a current signal) as shown in the lower part of FIG. 6, and it is not limited to the resistor R3.

When the TON/MODE pin is electrically connected with the input voltage Vin, the signal received is a constant value; hence, the clock detection circuit 35 does not detect an oscillating signal, and it outputs a signal determining that the power management chip 30 should operate in the first mode. In another aspect, if the TON/MODE pin is electrically connected with the phase voltage, the signal received is oscillating; thus, the clock detection circuit 35 outputs a signal determining that the power management chip 30 should operate in the second mode. The first and second modes are not limited to the foregoing CCM/DEM modes; they can be used for other functions or settings as well.

Figure 7:
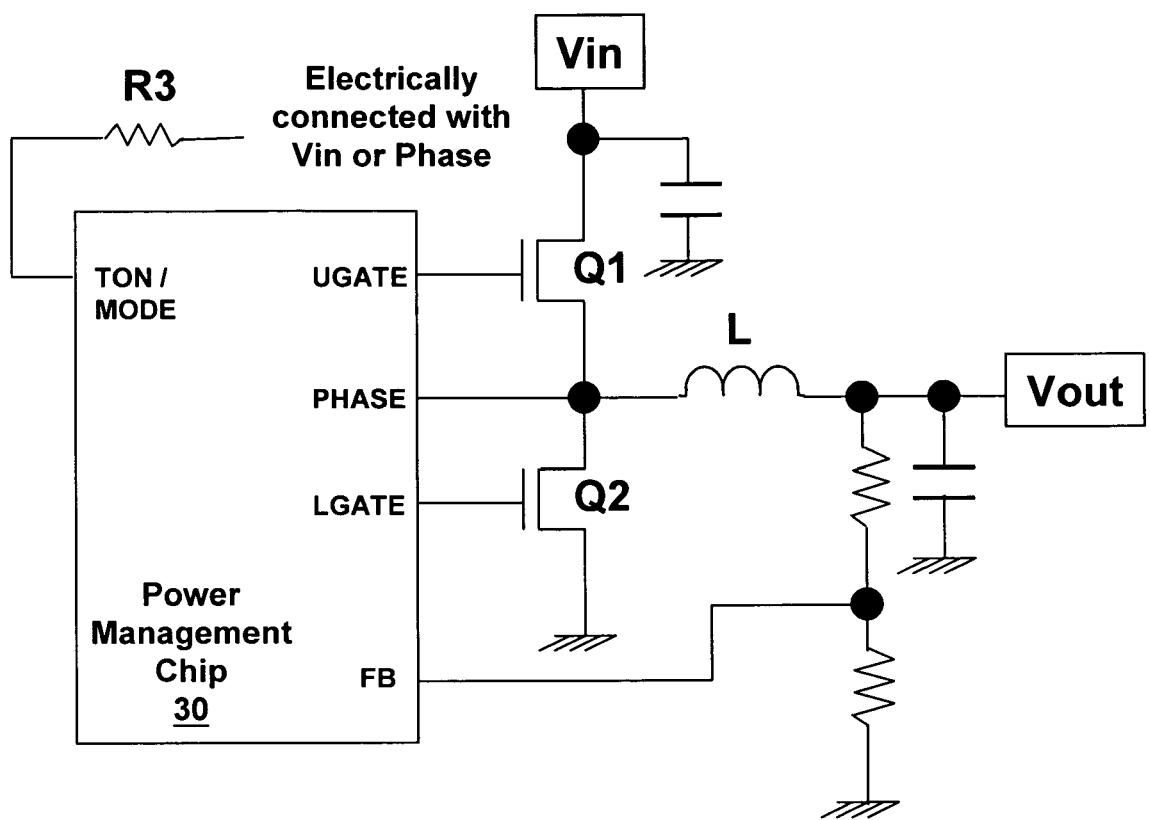
FIG. 7 shows an embodiment of the present invention in use of a buck converter circuit.

FIG. 7 shows an embodiment of the present invention applied in a buck converter circuit. As mentioned earlier, the TON/MODE pin can be electrically connected to the input voltage Vin or phase voltage, to determine the mode of the power management chip 30. Notably, the present invention is not limited for use in a buck converter circuit; it can be applied to a boost converter circuit, buck-boost converter circuit, or inverter converter circuit as well.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. In view of the foregoing, the spirit of the present invention should cover all such and other modifications and variations, which should be interpreted to fall within the scope of the following claims and their equivalents.

What is claimed is:

1. A power management chip with a dual function pin, the power management chip outputting pulse-width-modulation signals to control the switching of an up-gate transistor and a low-gate transistor for converting an input voltage to an output voltage, the up-gate and low-gate power transistors being electrically connected to a node, the power management chip comprising:
    a dual function pin having an electrical connection switchable between the input voltage and the node;
    a voltage sensing circuit electrically connected with the dual function pin for detecting a level of the input voltage; and
    a clock detection circuit electrically connected with the dual function pin for determining whether the signal received by the dual function pin is an oscillation signal.

2. The power management chip of claim 1, wherein the dual function pin provides both functions of power transistor ON-time calculation and mode selection.

3. The power management chip of claim 1, wherein an operation mode of the power management chip is determined by the connection of the dual function pin depending on whether it is electrically connected with the input voltage or the node.

4. The power management chip of claim 1, wherein the voltage sensing circuit detects a peak value of the signal received by the dual function pin to determine the level of the input voltage.

5. The power management chip of claim 1, wherein the clock detection circuit determines whether the signal received by the dual function pin is an oscillation signal by detecting whether the signal has a falling edge or a low level.

6. The power management chip of claim 1, wherein the dual function pin is electrically connected with the input voltage or the node via an interposed circuit therebetween.

7. The power management chip of claim 6, wherein the interposed circuit includes a resistor.

8. The power management chip of claim 6, wherein the interposed circuit includes a capacitor.

9. The power management chip of claim 6, wherein the interposed circuit includes a transconductor.

10. The power management chip of claim 1, which is used in a buck converter circuit, boost converter circuit, buck-boost converter circuit, or inverter converter circuit.

* * * * *